Jan. 26, 1971   R. PHILIPP   3,558,246
ROTARY PUMP FOR VISCOUS FLUIDS
Filed Dec. 23, 1968   3 Sheets-Sheet 1
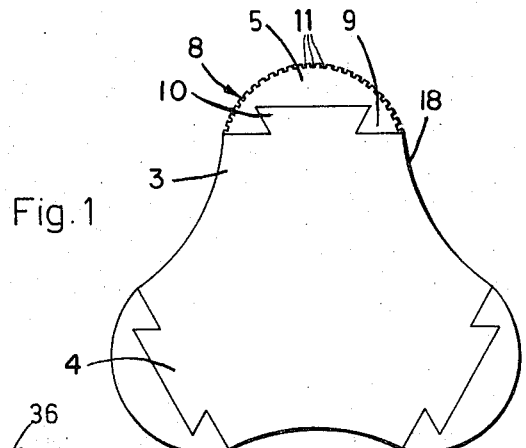
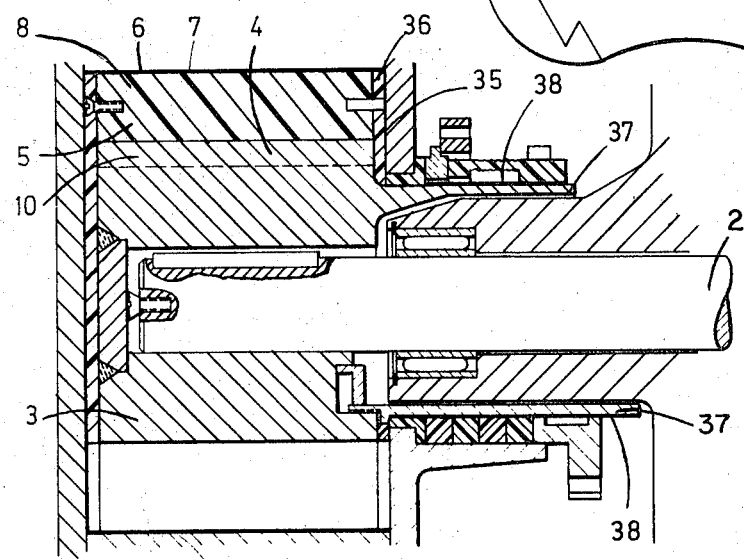
INVENTOR
RUDI PHILIPP
BY *Craig & Antonelli*
ATTORNEYS

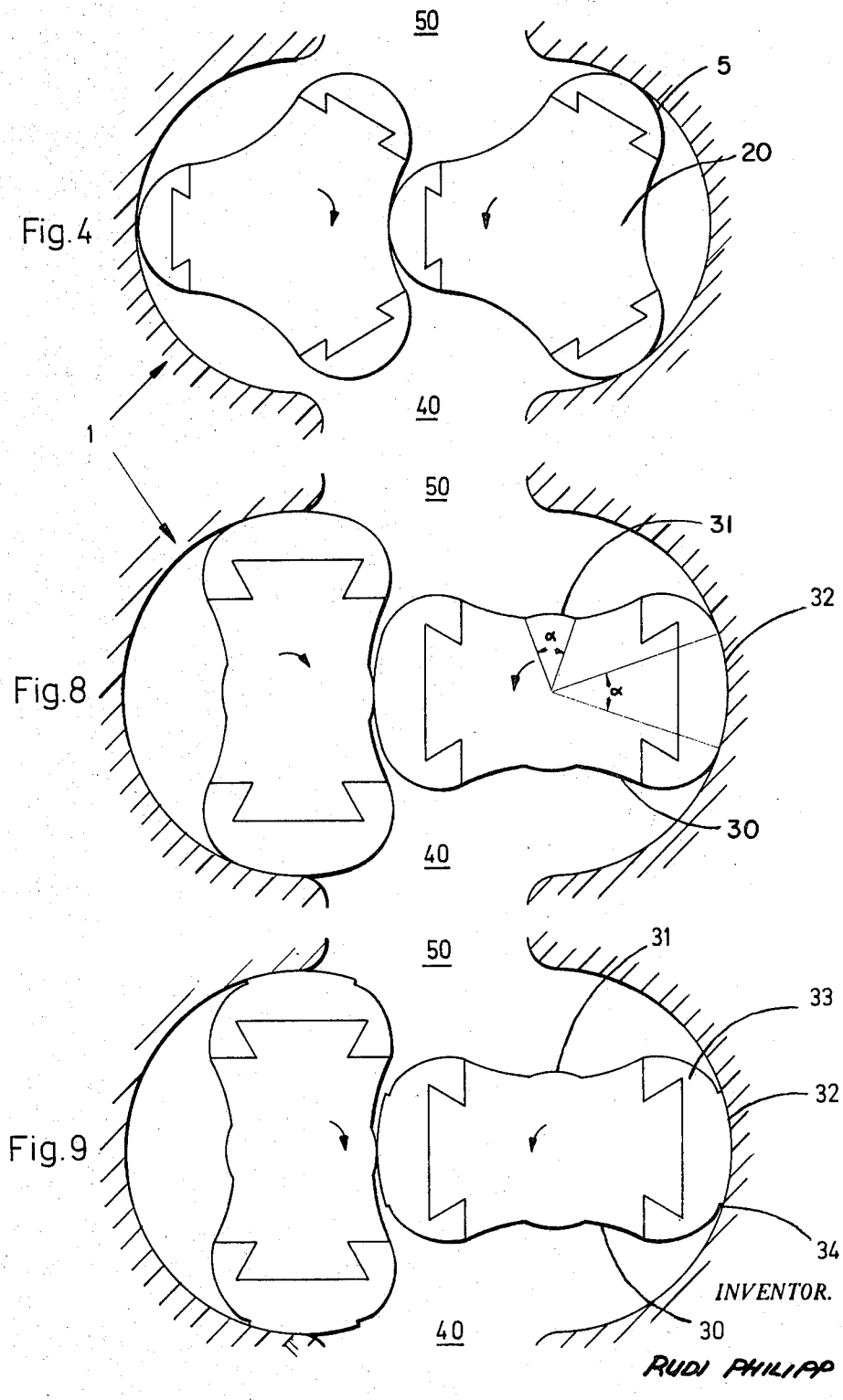

INVENTOR.
RUDI PHILIPP

BY Craig & Antonelli

ATTORNEYS

United States Patent Office 3,558,246
Patented Jan. 26, 1971

3,558,246
ROTARY PUMP FOR VISCOUS FLUIDS
Rudi Philipp, Saint-Ingbert, Germany, assignor to Eisenwerke Kaiserslautern G.m.b.H., Kaiserslautern, Germany
Filed Dec. 23, 1968, Ser. No. 786,247
Claims priority, application Germany, Nov. 7, 1968, 1,807,392
Int. Cl. F04c 5/00, 15/00
U.S. Cl. 418—117          6 Claims

ABSTRACT OF THE DISCLOSURE

A rotary Root's type pump for conveying viscous fluids with corrosive properties in which each of two rotors has a body of metal to which strips of a non-corrosive and wear-resistant plastic are removably secured which form at least the outwardly projecting rotor heads which are slidable along the inner wall of the pump housing which is provided with a coating of enamel and along the core or the reduced parts between the heads of the other rotor.

---

The present invention relates to a rotary pump of the Root's type which is adapted to convey viscous fluids which may also be inhomogeneous and have corrosive or abrasive properties, and comprises a pair of interengaging rotors forming pump vanes which are mounted on and driven by a pair of parallel shafts at equal speeds in opposite directions within an oval housing which is provided with an intake duct and an outlet duct.

More particularly, the present invention relates to improvements in a pump of the above-mentioned type as disclosed in U.S. Pat. No. 3,396,667.

It was one of the objects of the invention as disclosed in the mentioned patent to provide such a pump which is especially adapted for conveying viscous fluids with corrosive properties to be made of materials of a low cost. This was attained by providing the inner side of the pump housing with a coating of enamel, by making the rotors of the pump of a noncorrosive and wear-resistant plastic and rigidly securing them to drive shafts which also serve as rotor cores, and by designing each of the two rotors so as to form a single pump vane of an approximately semicircular cross section the peripheral surface of which is adapted to slide along the semicircular inner surface of the pump housing, while the substantially radial surfaces of each rotor which serve as working surfaces are made of a substantially S-shaped cross section and are adapted to slide or roll with a wiping motion along each other. Each of these working surfaces merges gradually in the form of a continuous curve with the outer peripheral surface of the rotor, while its inner end extends at an obtuse angle, for example, tangentially, to the peripheral surface of the core or shaft of the rotor.

Considerable experience with rotary pumps of the design as described above has shown that the plastics which have been used for producing the rotor vanes of such a pump and were made on the basis of polytetrafluoroethylene do not have a sufficient creeping strength which may result in serious malfunctions of the pump.

It is therefore an object of the present invention to improve a rotary pump of the general type as disclosed in the mentioned Pat. No. 3,396,667 so as to overcome the last-mentioned disadvantages, to render it fully operative and efficient for a very long period of time, and to reduce its cost of production.

According to the invention this object is attained by designing the rotors so that only parts thereof, namely, at least the surfaces of their heads which are slidable along the inner wall of the pump housing and along the cores or bases of the associated rotors, consist of a noncorrosive and wear-resistant plastic.

This has the advantage that the amount of plastic required on the rotors is now made so small that its creeping can no longer have any harmful influence upon the operation of the pump.

By designing the rotors in this manner, it is possible according to another feature of the invention to make the body of each rotor of a metal the outer surfaces of which are provided with an enamel coating, while the surfaces of the rotor heads are formed by strips of plastic which are secured to this metal body. The main body of each rotor may therefore be made of a relatively inexpensive material which like the inner walls of the housing is effectively protected from corrosion by an enamel coating. By requiring only a small part of each rotor to consist of plastic, for example, of the relatively expensive polytetrafluoroethylene, the further advantage is attained that the cost of production of the new rotors as a whole may be lower than those which were previously made entirely of such a plastic.

According to a preferred embodiment of the invention, each sealing strip on the rotor heads has a base of a shape so as to interengage in the radial direction of the rotor with corresponding guide projections or recesses on the rotor body when slipped from one end of the rotor longitudinally over or into these guide projections or recesses. Such a construction not only facilitates considerably the construction of the rotors as a whole but it also permits the individual sealing strips to be easily exchanged when damaged without requiring the rotor vanes or the entire rotors to be exchanged. Obviously, this exchangeability of the sealing strips reduces the cost of maintenance of the pump considerably.

For the same purpose, namely to prevent the rotor as much as possible from jamming, the invention further provides that the head surfaces and possibly also the base surfaces of the rotors form sectors of circles. Such a construction results in a very effective sealing action between the rotors and the inner walls of the pump housing and also between the associated rotors when sliding past each other.

A construction of the rotors in the manner as previously described also permits them to be provided with more than two vanes with head surfaces which are shaped accordingly.

According to one embodiment of the invention which has proved to be of particular advantage, each rotor is provided with two vanes which are disposed diametrically opposite to each other with respect to the rotor core and have curved head surfaces, while their base surfaces have a rectilinear shape.

In order to prevent solid particles which might be present in the fluid conveyed from adhering to the inner walls of the pump housing, the head surfaces of the rotors may be provided with wiping edges, for example, on the sealing strips of plastic.

For preventing such solid particles from affecting or damaging the enameled end surfaces of the rotors and also the inner end surfaces of the pump housing, the invention further provides that the inner end surfaces of the housing are covered with a flexible material, for example, a plastic, into which these particles may penetrate. For the same purpose it is also possible to provide the end surfaces of the pump housing with sealing strips of a flexible material.

If the end surfaces of the rotors are provided with disks of a soft material, for example, of tetrafluoroethylene or hard rubber, any engagement between the rotors and the end walls of the housing will be prevented and there will thus be no danger that the enamel coating on the rotors and the end walls of the housing might be damaged or that the rotors might jam.

Furthermore, the clearances between the rotors and the end walls of the housing may then be made very small with the result that the efficiency of the pump will be improved. The wiping effect which is then attained prevents the material to be conveyed from adhering to the end surfaces, while solid particles which might be contained in the material may penetrate into the soft end plates. In order to prevent the sealing strips which are inserted into the rotor bodies and form the head surfaces of the rotors from sliding longitudinally, they are preferably secured by screws or pins to disks of a soft material on the ends of the rotors.

Another feature of the invention consists in covering at least the part of the steel shaft of the pump which is located at the inside of the pump chamber with a protective sleeve of a noncorrosive material. Therefore, since only this sleeve has to consist of a noncorrosive material, for example, by being coated on the outside with a layer of enamel, the drive shaft may be made of a relatively inexpensive material. This sleeve is preferably integrally secured to or screwed directly upon the end surfaces of the rotor and projects from the housing at least until the shaft is properly mounted and sealed. If the sealing means consist of a stiffing-box packing, the sleeve is preferably made of acid-resistant steel, but if they consist of a series of slide-ring packings, the protective sleeve may be of less expensive material which is covered with enamel.

These and additional features and advantages of the present invention will become further apparent from the following detailed description thereof which is to be read with reference to the accompanying drawings, in which:

FIG. 1 shows a diagrammatic view of a rotor according to the invention which is provided with three vanes;

FIG. 2 shows an axial longitudinal section;

FIG. 3 shows an enlarged cross section of a part of a rotor according to a modification of the invention, while FIGS. 4 to 9 show diagrammatic views of several other modifications of the rotor according to the invention.

Figure 5:
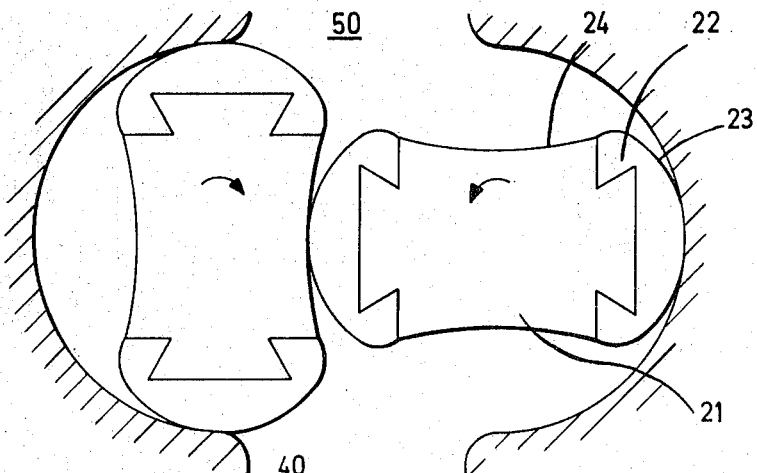

The rotary pump as illustrated in the drawings comprises an oval housing 1 in which a pair of rotors 3 which are mounted on parallel drive shafts 2 are rotatable in opposite directions to each other. As indicated in FIGS. 4 to 9, the housing 1 is provided with an intake duct 40 and a delivery or outlet duct 50.

FIGS. 1 and 2 illustrate a rotor 3 which is provided with three vanes 4 which are disposed at an angle of 120° relative to each other. The head portions 5 of these rotor vanes 4 are slidable along the inner wall 6 of housing 1 which is provided with a coating of enamel 7. As indicated in FIG. 2, the head portions 5 consist of a noncorrosive and wear-resistant plastic. In actual practice it has been found that the association of enamel and plastic on the surfaces of a rotary pump which are movable relative to each other produces very efficient results. A plastic which has proved to be very suitable in a pump of this type is one which is made on the basis of polytetrafluoroethylene.

The head portions 5 of the rotors which are provided in the form of sealing strips 8 may be secured in different manners to the rotor body 3. Each of the sealing strips 8 of the rotor as illustrated in FIG. 1 has an outer side forming a section of a cylinder, while its flat inner side forms a connecting part 9 which is of a dove-tailed cross section and interengages with a corresponding dovetail 10 on each rotor vane 4.

As illustrated on only one of the three sealing strips 8 in FIG. 1 the outer side of each of these strips is provided with wiping edges which are in this case formed by a series of notches 11. According to the modification of the invention as illustrated in FIG. 3, the sealing strip is divided into a plurality of individual elements 12 each of which has a base part 13 of a cross section forming approximately three quarters of a cylinder which is mounted within a recess 14 of a corresponding shape in the rotor vane 4 or in a removable head of this vane.

The base part 13 of each sealing element 12 is integral on its outer side with a wider part 15 which carries out the actual sealing function and engages into inclined recesses 16 in vane 4.

The wiping edges of the rotor according to FIG. 3 are formed by the lateral edges 17 of the sealing parts 15.

The sealing strips 8 according to FIG. 1 and the individual sealing elements 12 according to FIG. 3 may be slipped in their longitudinal direction from one end of the rotor over the dovetails 10 or into the recesses 14, 16, respectively. Consequently, if one or another of the sealing strips 8 or sealing elements 12 is defective, it may be easily exchanged.

As illustrated in FIG. 1, the surfaces of the rotor core between the head portions 5 have an arcuate shape. It is also possible to make the outer surfaces of the head portions 5 of an arcuate shape, although the core surfaces must then have a different curvature.

The rotors may be made of any suitable metal, but their outer surfaces must be resistant to corrosion. For this purpose, these outer surfaces are preferably covered with a coating of enamel.

Figure 6:
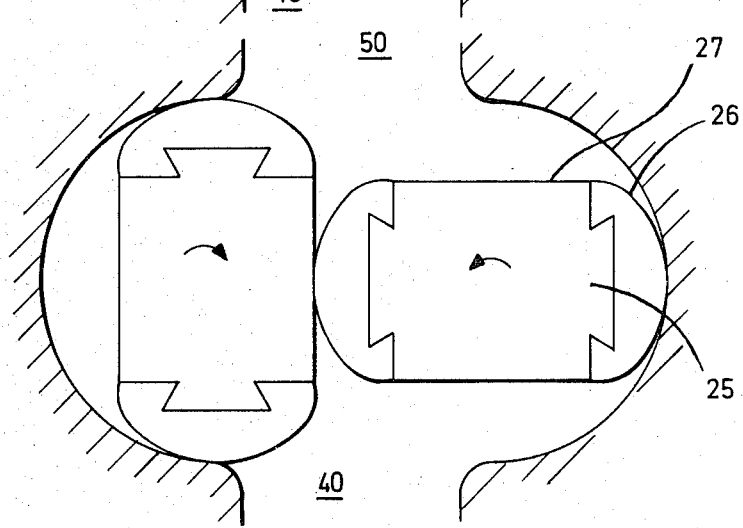

FIG. 4 illustrates a pair of three-vane rotors 20 and arcuate core surfaces between the head portions 5. In FIG. 5, each rotor is provided with two vanes 22 which extend diametrically to the rotor core 21 and have head portions 23 consisting of removable sealing strips with curved outer surfaces and arcuate core portions 24 between these strips. In FIG. 6, each of the two-vane rotors 25 has removable head portions 26 of an arcuate shape and straight core portions 27 between the head portions.

Figure 7:
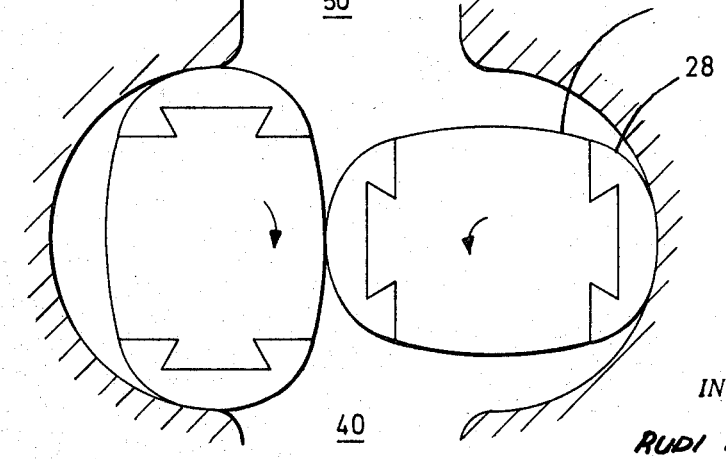

FIG. 7 illustrates a pair of rotors each of which has approximately an elliptical cross section. The head surfaces 28 merge into arcuate core surfaces 29 with the same direction of curvature.

FIGS. 8 and 9 illustrate another modification of the rotors according to the invention, in which each core surface is composed of two arcuate sections 30 of the same degree and direction of curvature and another arcuate section 31 centrally between the sections 30 which is curved in the opposite direction. Each head surface 32 is again arcuate up to the wiping edges, while the remainders form envelope curves. In FIG. 9 the head surfaces 32 project slightly beyond the lateral curved parts 33 so as to form wiping edges 34.

FIG. 2 shows an axial longitudinal section of a part of a rotary pump according to the invention. The two end surfaces of the rotors which may be coated with enamel are covered either by plates 36 of a flexible material, for example, plastic, or by individual sealing strips, not shown, of a soft material. These plates or strips may also be secured to the end surfaces 35 of the housing.

As further shown in FIG. 2, the drive shaft is provided with a protective sleeve 37 of a noncorrosive material which permits the shaft itself to be made of a relatively inexpensive material. This sleeve 37 is preferably integral with the rotor 3 or directly secured thereto by screws and consists of the same material as the rotor and may likewise be enameled on its outer side 38. Of course, in place of an enamel coating it is also possible to employ any other protective coating which is equally efficient. The protective sleeve 37 may, however, also consist of a noncorrosive steel.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. In a rotary pump of the Root's type for conveying viscous fluids with corrosive and abrasive properties, comprising an oval housing having an intake duct and an outlet duct, a pair of parallel shafts rotatable in said housing and laterally spaced from each other and adapted to be driven at the same speed in opposite directions, and a pair of rotors each mounted on and rotatable by one of said shafts within said housing, wherein the improvement essentially comprises at least the inner wall surface of said housing being provided with an enamel coating, each of said rotors consisting of a main body of metal covered at the outer surface thereof by an enamel coating, sealing means consisting of polytetrafluoroethylene secured to and covering the head parts of the outer surfaces of said metal body, which sealing means are in sliding contact with the enamel inner wall surface of said housing and also in sliding contact with the enamel coated body of the adjacent rotor, and disks of flexible material being secured to the end faces of said rotors.

2. A rotary pump according to claim 1, wherein said sealing means comprise strips of said polytetrafluoroethylene removably secured to said metal body of each said rotor in parallel relationship with respect to one another and to each of the rotor axes.

3. A rotary pump according to claim 1, wherein the head parts comprise wiping edges.

4. A rotary pump according to claim 1, wherein said shafts consist of steel, and a sleeve having an enamel coated outer surface which covers at least the parts of said shafts exposed to the fluids.

5. A rotary pump according to claim 1, further comprising means for connecting each rotor to its associated shaft so as to be nonrotatable relative thereto but slidable in its axial direction to permit said rotor to be removed from said shaft in one direction.

6. A rotary pump according to claim 1, wherein said disks consist of polytetrafluoroethylene.

References Cited

UNITED STATES PATENTS

| | | | |
|---|---|---|---|
| 924,773 | 6/1909 | Hanman | 103—126(TO) |
| 1,361,423 | 12/1920 | Waterous | 103—126(TO) |
| 2,492,935 | 12/1949 | McCulloch et al. | 230—141 |
| 2,858,769 | 11/1958 | Doble | 103—117(R) |
| 3,174,274 | 3/1965 | Frye | 123—12 |
| 3,282,495 | 11/1966 | Walls | 103—126(M) |
| 3,396,667 | 8/1968 | Schmitt | 103—126(TO) |

FOREIGN PATENTS

| | | | |
|---|---|---|---|
| 427,472 | 5/1911 | France | 103—126(TO) |
| 446,287 | 9/1912 | France | 103—126(TO) |

CARLTON R. CROYLE, Primary Examiner

W. J. GOODLIN, Assistant Examiner

U.S. Cl. X.R.

418—153, 178, 179